United States Patent
Hui et al.

(10) Patent No.: US 9,395,538 B2
(45) Date of Patent: Jul. 19, 2016

(54) VEHICLE IMAGER ASSEMBLY WITH LOCALIZED WINDOW DEFOGGING

(71) Applicant: DELPHI TECHNOLOGIES, INC., Troy, MI (US)

(72) Inventors: Thomas Hui, Singapore (SG); Yew Kwang Low, Singapore (SG); Kok Wee Yeo, Singapore (SG)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 14/497,570

(22) Filed: Sep. 26, 2014

(65) Prior Publication Data
US 2016/0091714 A1    Mar. 31, 2016

(51) Int. Cl.
| G02B 27/00 | (2006.01) |
| H04N 5/225 | (2006.01) |
| H04N 7/18 | (2006.01) |
| B60R 1/00 | (2006.01) |

(52) U.S. Cl.
CPC .......... *G02B 27/0006* (2013.01); *B60R 1/002* (2013.01); *H04N 5/2257* (2013.01); *H04N 7/183* (2013.01)

(58) Field of Classification Search
CPC .......... G02B 7/1815; G02B 27/0006; G02B 5/0278; H04N 5/2257; H04N 7/183; B60R 1/002
USPC ............... 359/507, 512, 601; 348/148, 169
See application file for complete search history.

(56) References Cited

U.S. PATENT DOCUMENTS

| 1,700,544 A | * | 1/1929 | Ruka ..................... H05B 3/84 219/203 |
| 2,089,928 A | * | 8/1937 | Perkins .............. B60H 1/00464 165/126 |
| 2,102,454 A | * | 12/1937 | Bennett .................. B60J 3/0204 160/33 |
| 4,196,338 A | * | 4/1980 | Edel ....................... G05D 22/02 200/61.05 |
| 5,147,716 A | * | 9/1992 | Bellus ..................... B29C 70/62 264/1.34 |
| 6,353,392 B1 | * | 3/2002 | Schofield ........... B60H 1/00785 318/444 |
| 7,731,373 B2 | | 6/2010 | Oskarsson et al. |
| 2004/0144911 A1 | * | 7/2004 | Stam ...................... B60Q 1/143 250/208.1 |
| 2007/0115357 A1 | * | 5/2007 | Stein .................... B60Q 1/0023 348/148 |
| 2008/0203078 A1 | * | 8/2008 | Huerter ................... B60S 1/026 219/203 |
| 2012/0015149 A1 | * | 1/2012 | Keefe ..................... B29C 59/02 428/152 |
| 2012/0026318 A1 | * | 2/2012 | Huelsen ............... B60S 1/0844 348/135 |
| 2014/0232869 A1 | * | 8/2014 | May ..................... H04N 5/2171 348/148 |

FOREIGN PATENT DOCUMENTS

| DE | 10 2012 217047 A1 | | 8/2014 |
| JP | 2004-25930 | * | 1/2004 |
| JP | 2004-262320 A | | 9/2004 |

* cited by examiner

*Primary Examiner* — Ricky D Shafer
(74) *Attorney, Agent, or Firm* — Lawrence D. Hazelton

(57) ABSTRACT

An imager assembly adapted to capture an image proximate to a vehicle includes a camera and a heater element. The camera is configured to capture an image of a field-of-view about a vehicle through a window of the vehicle. The heater element is configured to direct heat toward a portion of the window that intersects the field-of-view for defogging the portion of the window. The heater element is located outside of the field-of-view.

5 Claims, 2 Drawing Sheets

VEHICLE IMAGER ASSEMBLY WITH LOCALIZED WINDOW DEFOGGING

TECHNICAL FIELD OF INVENTION

This disclosure generally relates to a camera assembly or imager assembly, and more particularly relates to a way to defog a portion of a window of a vehicle through which the assembly is viewing an area proximate to the vehicle without interfering with or degrading images captured by the camera.

BACKGROUND OF INVENTION

It is known to equip a vehicle with an imager assembly that captures images of a field-of-view proximate to the vehicle. If the imager assembly is located within the passenger compartment and is 'looking' through a window (e.g. windshield) of the vehicle to capture images of an area around the vehicle, fogging of the window may undesirable degrade the clarity of the images. Such in-vehicle imager assemblies are typically equipped with a glare shield to reduce glare at the portion of the window that intersects the field-of-view of the imager assembly. However, the glare shield may undesirably block airflow output by the vehicle heating and ventilation system from impinging on the portion of the window that intersects the field-of-view of the imager assembly.

It has been proposed to apply resistive heater elements to the portion of the window that intersects the field-of-view of the imager assembly. However, this has been observed to undesirably degrade the clarity of the images captured by the imager assembly. It has also been proposed to dry-nitrogen purge the volume enclosed by the glare shield. However, this solution undesirably increased expense, and may be prone to leakage that could lead to window fogging.

SUMMARY OF THE INVENTION

In accordance with one embodiment, an imager assembly adapted to capture an image proximate to a vehicle is provided. The assembly includes a camera and a heater element. The camera is configured to capture an image of a field-of-view about a vehicle through a window of the vehicle. The heater element is configured to direct heat toward a portion of the window that intersects the field-of-view for defogging the portion of the window. The heater element is located outside of the field-of-view.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
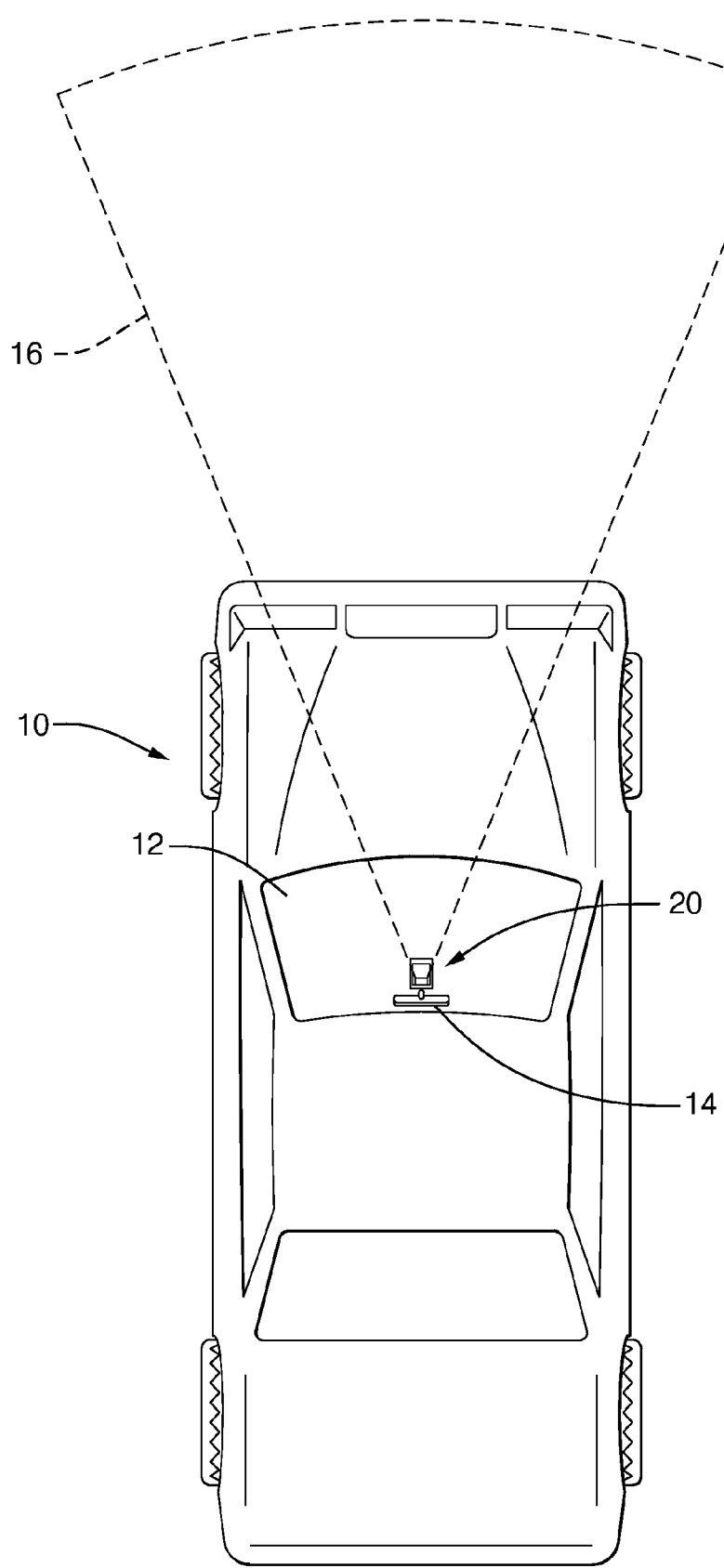
FIG. 1 is a top view of a vehicle equipped with an imager assembly in accordance with one embodiment.

FIG. 1 illustrates a non-limiting example of a vehicle 10 equipped with an imager assembly, hereafter referred to as the assembly 20, adapted to capture an image of a field-of-view 16 proximate to the vehicle 10. In this non-liming example the assembly 20 is shown as being mounted behind a window 12 (i.e. windshield) of the vehicle 10, forward of a rear-view mirror 14 so the field-of-view 16 is forward of the vehicle 10. It is contemplated that the assembly 20 and the rear-view mirror 14 could be integrated into a unitary assembly. It is also contemplated the assembly 20 could be located elsewhere in the vehicle to have, for example, a field-of-view directed toward the rear of the vehicle 10.

Figure 2:
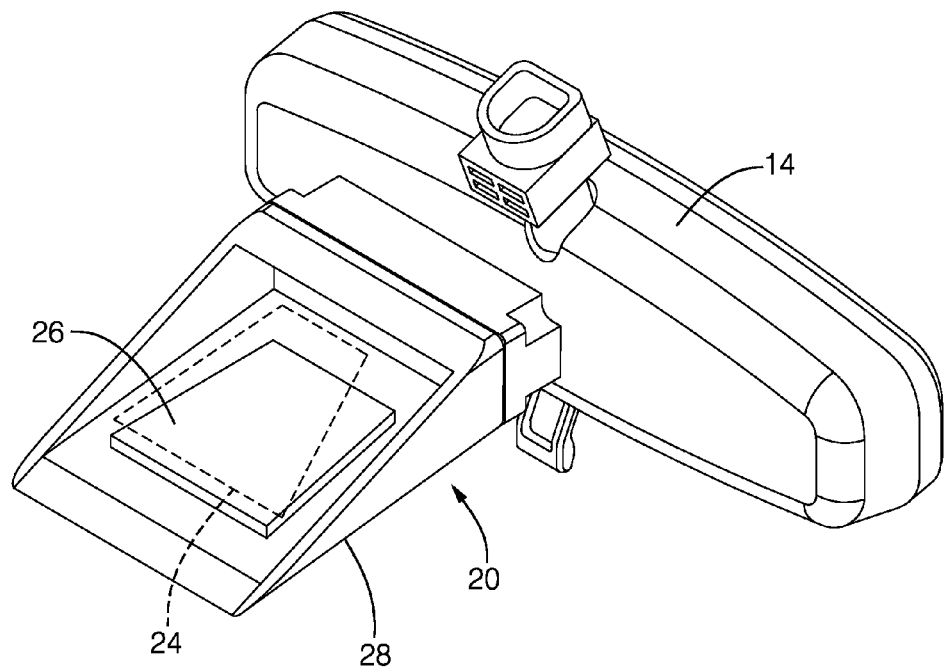
FIG. 2 is a perspective view of the imager assembly of FIG. 1 in accordance with one embodiment.
Figure 3:
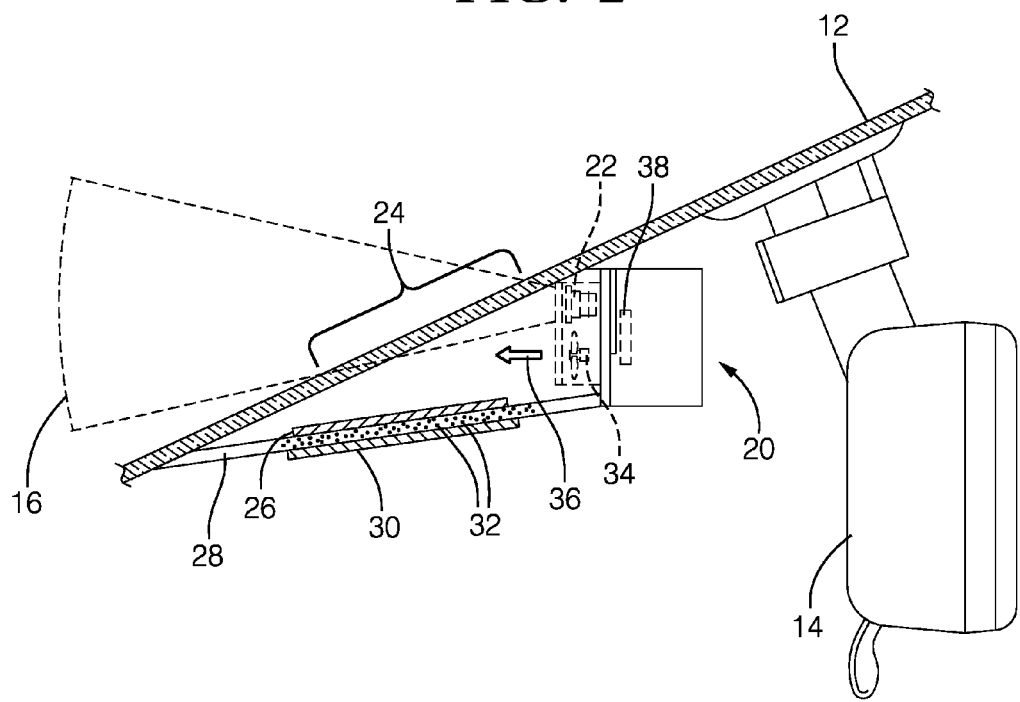
FIG. 3 is a side view of the imager assembly of FIG. 1 in accordance with one embodiment.

FIGS. 2 and 3 further illustrate non-limiting features of the assemble 20. The assembly 20 includes a camera 22 configured to capture an image of the field-of-view 16 about a vehicle through a portion 24 of the window 12 that intersects the field-of-view 16. In order to avoid the problems of window fogging described above, the assembly 20 includes a heater element 26 configured to direct heat toward the portion 24 of the window 12 that intersects the field-of-view 16 for defogging the portion 24. The heater element 26 is advantageously located outside of the field-of-view 16 so that the images captured by the camera 22 are not degraded by, for example, heated wires attached to the surface of, or embedded within, the window 12 within the portion 24.

The assembly 20 may include a glare shield 28 configured to reduce glare at the portion 24 of the window 12 that intersects the field-of-view 16. The heater element 26 may advantageously be mounted on the inside of the glare shield 28 such that the heater element 26 has a clear line of sight to the portion 24 and so can more efficiently remove any fogging present on the portion 24. While a resistive type heater element is contemplated, the heater element may be advantageously configured as inductive type heater element. Accordingly, the heater element may be formed of ferromagnetic material, and the assembly 20 may include an inductor coil 30 configured to heat the heater element 26. Suitable ferromagnetic materials for the heater element 26 include iron, nickel, cobalt and most of their alloys which absorb electromagnetic field from the inductor coil 30 and generates Eddy currents to heat the heater element 26. The outline of the heater element can be selected to correspond to the portion 24. A suitable thickness for the heater element is four millimeters (4 mm).

In one embodiment, the ferromagnetic material that forms the heater element may be in the form a plate as illustrated in FIGS. 2 and 3. Alternatively, the heater element may be a circular shaped plate to better cooperate with the inductor coil 30 to generate heat. The heater element 26 may be mounted on the inner surface of the glare shield 28 as illustrated, or may be embedded or insert molded into the glare shield 28 to be an integral part of the glare shield 28. In another embodiment, the ferromagnetic material may be provided in the form of particles 32 embedded in the glare shield 28. The particles 32 may be Nickel coated graphic fillers/fibers or formed of the same ferromagnetic material used to form the heater element 26, and may be mixed into the polymeric compound such as a high temperature thermoplastic used to mold the glare shield 28, as will be recognized by those in the molding arts.

The assembly 20 may also include a fan 34 configured to direct airflow 36 toward or onto the portion 24 of the window 12 that intersects the field-of-view 16. By providing the fan 34, the portion 24 may be more quickly cleared of fogging.

The assembly 20 may also include a controller 38 configured to control the heating of the heater element 26 and the fan 34 if so equipped. The controller 38 may include a processor (not shown) such as a microprocessor or other control circuitry such as analog and/or digital control circuitry including an application specific integrated circuit (ASIC) for processing data as should be evident to those in the art. The controller 38 may include memory, including non-volatile memory, such as electrically erasable programmable read-only memory (EEPROM) for storing one or more routines, thresholds and captured data. The one or more routines may be executed by the processor to perform steps for controlling the heater element 26 and the fan 34. By way of example and not limitation, the controller 38 may receive an image from the camera 22 and determine if the portion 24 is fogged based on an analysis of the image. For example, if no well-defined edges are detected in an image from the camera 22, it can be assumed that the portion 24 is fogged, and heat is needed from the heater element 26. Alternatively, the controller 38 may receive signals from a humidity sensor (not shown), a temperature sensor (not shown), and the like, and determine if fogging of the portion 24 is likely based on those signals.

Accordingly, an imager assembly (the assembly 20) configured to defog the portion 24 of the window 12 is provided. The heater element 26 is advantageously located outside of the field-of-view 16 so that images captured by the camera 22 are not unnecessarily degraded. The heater element 26 may advantageously be formed of ferromagnetic material so that heat can be quickly generated at the surface of the glare shield 28.

While this invention has been described in terms of the preferred embodiments thereof, it is not intended to be so limited, but rather only to the extent set forth in the claims that follow.

We claim:

1. An imager assembly adapted to capture an image proximate to a vehicle, said assembly comprising:
    a camera configured to capture an image of a field-of-view about a vehicle through a window of the vehicle;
    a heater element configured to direct heat toward a portion of the window that intersects the field-of-view for defogging the portion of the window, wherein the heater element is located entirely outside of the field-of-view, wherein the heater element is an inductive type heater element; and
    a glare shield configured to reduce glare at the portion of the window that intersects the field-of-view, wherein the heater element is attached to the glare shield.

2. The assembly in accordance with claim 1, wherein the heater element includes an inductor coil configured to heat ferromagnetic material that is part of the glare shield.

3. The assembly in accordance with claim 2, wherein the ferromagnetic material includes a plate attached to the glare shield.

4. The assembly in accordance with claim 2, wherein the ferromagnetic material includes particles embedded in the glare shield.

5. The assembly in accordance with claim 1, wherein the assembly includes a fan configured to direct airflow onto the portion of the window that intersects the field-of-view.

* * * * *